United States Patent
Bonnerup et al.

(10) Patent No.: US 12,366,039 B2
(45) Date of Patent: Jul. 22, 2025

(54) PACKAGING MATERIAL FOR PACKAGING OF LIQUID AND FOOD

(71) Applicant: Stora Enso OYJ, Helsinki (FI)

(72) Inventors: Chris Bonnerup, Floda (SE); Magnus Ekberg, Fors (SE); Kaj Backfolk, Villmanstrand (FI)

(73) Assignee: Stora Enso OYJ, Helsinki (FI)

( * ) Notice: Subject to any disclaimer, the term of this patent is extended or adjusted under 35 U.S.C. 154(b) by 403 days.

(21) Appl. No.: 17/999,060

(22) PCT Filed: May 18, 2021

(86) PCT No.: PCT/IB2021/054255
§ 371 (c)(1),
(2) Date: Nov. 17, 2022

(87) PCT Pub. No.: WO2021/234559
PCT Pub. Date: Nov. 25, 2021

(65) Prior Publication Data
US 2023/0212825 A1 Jul. 6, 2023

(30) Foreign Application Priority Data
May 18, 2020 (SE) .................................. 2050576-4

(51) Int. Cl.
*D21H 27/10* (2006.01)
*B32B 27/10* (2006.01)
(Continued)

(52) U.S. Cl.
CPC ............. *D21H 27/10* (2013.01); *B32B 27/10* (2013.01); *B32B 27/32* (2013.01); *B32B 37/24* (2013.01);
(Continued)

(58) Field of Classification Search
CPC ........ D21H 27/10; D21H 19/12; D21H 19/22; D21H 19/824; D21H 23/50; D21H 23/64;
(Continued)

(56) References Cited

U.S. PATENT DOCUMENTS 4,460,425 A 7/1984 Rausér et al.
5,587,204 A 12/1996 Kinsey, Jr. et al.
(Continued)

FOREIGN PATENT DOCUMENTS

CN 1205670 A 1/1999
CN 101111640 A 1/2008
(Continued)

OTHER PUBLICATIONS

Extended European Search Report from corresponding European application No. 21808167.7, dated May 28, 2024.
(Continued)

*Primary Examiner* — James C Yager
(74) *Attorney, Agent, or Firm* — Greer, Burns & Crain, Ltd.

(57) ABSTRACT

The invention discloses a paperboard for packaging of a heat-sealable packaging material comprising: —a paperboard substrate comprising a first and a second side, —a first and an optional second dispersion coating layer on the first side, which first and optional second dispersion coating layer provides a barrier against at least one of liquid, moisture, grease and gas, —an extrusion coated barrier layer comprising a polyolefin, wherein the first and optional second dispersion coating layer is applied between the paperboard substrate and the extrusion coated barrier layer, and wherein the coat weight of the extrusion coated barrier layer is less than 15 gsm. The packaging material according of the invention minimizes the amount of plastic coating, but still provides the needed barrier properties for the packaging (Continued)

of food and/or liquid. The packaging material has especially been shown to provide a longer shelf life for food items packed in a packaging made from the material. Especially, the packaging material provides gas-, liquid and/or grease barrier properties. Although the packaging material comprises such low amount of extruded thermoplastic polymers, the material is readily heat-sealable.

14 Claims, 1 Drawing Sheet

(51) Int. Cl.
| | |
|---|---|
| B32B 27/32 | (2006.01) |
| B32B 37/24 | (2006.01) |
| B32B 38/00 | (2006.01) |
| B65D 65/40 | (2006.01) |
| B65D 65/42 | (2006.01) |
| D21H 19/12 | (2006.01) |
| D21H 19/22 | (2006.01) |
| D21H 19/82 | (2006.01) |
| D21H 23/50 | (2006.01) |
| D21H 23/64 | (2006.01) |
| D21H 23/72 | (2006.01) |

(52) U.S. Cl.
CPC ............ *B32B 38/164* (2013.01); *B65D 65/40* (2013.01); *B65D 65/42* (2013.01); *D21H 19/12* (2013.01); *D21H 19/22* (2013.01); *D21H 19/824* (2013.01); *D21H 23/50* (2013.01); *D21H 23/64* (2013.01); *D21H 23/72* (2013.01); *B32B 2037/243* (2013.01); *B32B 2250/40* (2013.01); *B32B 2255/12* (2013.01); *B32B 2255/26* (2013.01); *B32B 2307/31* (2013.01); *B32B 2307/718* (2013.01); *B32B 2307/7244* (2013.01); *B32B 2307/7246* (2013.01); *B32B 2307/7265* (2013.01); *B32B 2317/12* (2013.01); *B32B 2439/70* (2013.01)

(58) Field of Classification Search
CPC ...... D21H 23/72; D21H 19/20; D21H 19/826; D21H 19/82; D21H 19/54; B32B 27/32; B32B 37/24; B32B 38/164; B32B 2037/243; B32B 2250/40; B32B 2255/12; B32B 2255/26; B32B 2307/31; B32B 2307/718; B32B 2307/7244; B32B 2307/7246; B32B 2307/7265; B32B 2317/12; B32B 2439/70; B32B 2250/02; B32B 2255/28; B32B 29/002; B32B 2307/7242; B32B 2439/40; B32B 29/00; B65D 65/40; B65D 65/42; Y02W 90/10; C09D 123/10; C09D 123/04; C09D 103/02; C09D 123/00; C09D 129/04
See application file for complete search history.

(56) References Cited

U.S. PATENT DOCUMENTS

| | | |
|---|---|---|
| 11,504,952 B2 | 11/2022 | Noda et al. |
| 2009/0142523 A1 | 6/2009 | Nilsson et al. |
| 2011/0248076 A1 | 10/2011 | Bentmar et al. |
| 2019/0352854 A1 | 11/2019 | Backfolk et al. |

FOREIGN PATENT DOCUMENTS

| | | |
|---|---|---|
| CN | 102245386 A | 11/2011 |
| CN | 110100059 A | 8/2019 |
| EP | 0934160 A1 | 8/1999 |
| EP | 2358942 A2 | 8/2011 |
| EP | 2777934 A1 | 9/2014 |
| JP | 2005126482 A | 5/2005 |
| JP | 2008230199 A | 10/2008 |
| JP | 2020069803 A | 5/2020 |
| WO | 9716312 | 5/1997 |
| WO | 9854410 | 12/1998 |
| WO | 2010052571 A2 | 5/2010 |
| WO | 2015155413 A1 | 10/2015 |
| WO | 2019069963 A1 | 4/2019 |
| WO | 2019239334 A1 | 12/2019 |

OTHER PUBLICATIONS

International Search Report from corresponding PCT application No. PCT/IB2021/054255, mailed on Mar. 17, 2022.
International Search Report from corresponding PCT application No. PCT/IB2021/054255, mailed on Sep. 23, 2021.
Vyorykka, J. et al., Aqueous polyolefin dispersion—for low energy polyolefin melt application, in Proceedings of the 12th Tappi Place Conference, May 18-20, 2009, Budapest, Hungary.

PACKAGING MATERIAL FOR PACKAGING OF LIQUID AND FOOD

This application is a U.S. National Phase under 35 U.S.C. § 371 of International Application No. PCT/IB2021/054255 filed May 18, 2021, which claims priority under 35 U.S.C. §§ 119 and 365 to Swedish Application No. 2050576-4 filed May 18, 2020.

FIELD OF THE INVENTION

The present invention relates to a packaging material for liquid or food, a method to produce such a packaging material and a packaging comprising the packaging material.

BACKGROUND

Fiber based material used in packages or cups for liquid, dry or frozen food is usually provided with barrier coatings both on the inside (facing the packed item) and on the outside (print-side). The barrier coating applied on the inside makes the material resistant against e.g. liquids, grease, aroma and/or gas and enables it to withstand the influence of the packed item on the packing material. The barrier coating should also be heat-sealable. The barrier on the outside is applied to protect the packed item from the surrounding, especially from water vapor and condensation that is formed on the surface due to temperature fluctuations or temperature differences between cup outside vs cup inside (when filled).

Barriers are normally created by coating the fiber based substrate (the paperboard) with a composition which gives the substrate barrier properties. The most commonly used materials when forming a barrier on a fiber based product are polyolefins, such as polyethylene (PE) or polypropylene (PP), which usually are extrusion coated or laminated to the fiber based substrate. Today, also bio-based versions thereof are used including other bio-based polymers such as PLA. Liquid packaging board is usually provided with polymer coating on both sides and oftentimes with an additional aluminum foil layer on the inside. Paperboard intended for cups is oftentimes provided with a polyolefin coating to provide a barrier both on the inside towards the liquid content and on the outer/print side to provide a barrier against moisture arising from condensation.

Paperboard comprising extrusion coated or laminated polyolefin layers are however difficult to recycle and are usually not biodegradable or recyclable. The extrusion coated polymers are hard to disintegrate and re-use as part of a broke handling in paper and paperboard making. Legislations to ban the use of plastics are further discussed worldwide in order to reduce plastic waste.

In the prior art, dispersion barrier coatings have been proposed. EP2358942 discloses a paperboard coated with a first and a second barrier coating layer consisting of an aqueous polymer dispersion comprising from about 70-90 wt % of a polymer emulsion and 10-30 wt % of a pigment. WO2015155413 discloses a coated food cardboard, with a dispersion barrier coating applied between the board layer and a pigment coating layer. WO9854410 discloses a coated board comprising a talc containing polymeric dispersion barrier layer. However, dispersion coatings are oftentimes not enough to provide the required barriers against liquid or food and to deliver a long ambient shelf life.

Thus, there remains a need for a heat sealable fiber-based packaging material for liquid, frozen or dry food, which packaging material is repulpable with high yield and which still provides the required barrier properties for long ambient shelf life.

SUMMARY OF THE INVENTION

In a first aspect, the invention discloses a paperboard for packaging of a heat-sealable packaging material comprising:
- a paperboard substrate comprising a first and a second side,
- a first and an optional second dispersion coating layer on the first side, which first and optional second dispersion coating layer provides a barrier against at least one of liquid, moisture, grease and gas,
- an extrusion coated barrier layer comprising a polyolefin, wherein the first and optional second dispersion coating layer is applied between the paperboard substrate and the extrusion coated barrier layer, and
  wherein the coat weight of the extrusion coated barrier layer is less than 15 gsm, preferably less than 10 gsm, most preferably less than 7 gsm.

The packaging material according of the invention minimizes the amount of plastic coating, but still provides the needed barrier properties for the packaging of food and/or liquid. The packaging material has especially been shown to provide a longer shelf life for food items packed in a packaging made from the material. Especially, the packaging material provides gas-, liquid and/or grease barrier properties. Although the packaging material comprises such low amount of extruded thermoplastic polymers, the material is readily heat-sealable.

Preferably, the said extrusion coated barrier layer is the only extrusion coated barrier layer of the packaging material and the packaging material does not comprise any further extrusion coated- or laminated thermoplastic polymer layers. Further preferred, the packaging does not comprise aluminum, such as a layer or foil of aluminum. The said extrusion coated barrier layer is preferably adapted to form the inside of a thereof formed packaging and is thus adapted to be in contact with the content of such a formed packaging.

In a second aspect, the invention defines a method to produce a packaging material comprising the steps of:
- providing a paperboard substrate comprising a first and a second side,
- applying, in a first coating step, at least one first dispersion coating layer on the first side, which dispersion coating layer provides a barrier against at least one of liquid, moisture, grease and gas, forming a dispersion coated substrate,
- drying said dispersion coated substrate,
- applying, in a second coating step, an extrusion coated barrier layer comprising a polyolefin on said dispersion coated substrate by extrusion coating,
- wherein the extrusion coated barrier layer is applied at a coat weight of less than 15 gsm, preferably less than 10 gsm, most preferably less than 7 gsm.

The method may be further characterized by the features defining the heat sealable packaging material according to the first aspect of the invention.

In a third aspect, the invention defines a packaging, preferably a liquid and/or food packaging, comprising or being made from the above described packaging material. The packaging is suitable for both cold and warm liquids and/or food.

DETAILED DESCRIPTION

"Paperboard substrate" as used herein refers to a fiber based substrate comprising cellulose fibers. A typical paperboard substrate used for packaging material comprises at least one ply, preferably several plies. The paperboard substrate may comprise bleached and/or unbleached fibers and it may be surface sized. The paperboard substrate is preferably a multilayer packaging paperboard, comprising at least two plies, a back ply and a top ply. The paperboard substrate may comprise for example a top and a back ply and at least one middle ply. The paperboard substrate may have a basis weight of at least 120 gsm, or at least 150 gsm, preferably at least 180 gsm.

Such a multilayer paperboard substrate is particularly suitable for liquid and/or food packaging.

The gram mage or basis weight of a paperboard, substrate or coating layer refers to the weight expressed as grams per square meter, gsm or $g/m^2$. As used herein, gsm and $g/m^2$ may be used interchangeable.

If not specifically denoted otherwise, given % are weight %, and are calculated on the basis of a dry weight of 100 weight % of the respective object, such as a layer, ply or packaging.

As used herein, "dispersion coating layer" refers to a layer that has been applied by dispersion coating onto the paperboard substrate. As used herein, "dispersion coating" refers to a coating technique where an aqueous dispersion of fine polymer particles is applied to the surface of a paper or paperboard to form a solid, substantially non-porous film after drying. The dispersion coating layers may be applied by the use of roller coating, spray coating, curtain, blade coating, slot coating, immersion coating, gravure roll coating, reverse direct gravure coating, rod coating, soft-tip blade coating and/or combinations thereof. Preferred coating methods are curtain, blade coating and rod coating. Dispersion coatings can be recycled.

As used herein, "dispersion coated polyolefin" refers to polyolefin applied by dispersion coating.

The term "latex" as used herein refers to an aqueous suspension of polymer particles, which can be natural polymers, synthetic polymers, synthetic polymers derived from biomasses or combination thereof.

The water absorption rate as expressed herein is measured using COBB 600 in accordance with SCAN-P 12:64.

The Water Vapor Transfer Rate as expressed herein is measured in accordance with ASTM F1249 with Mocon instrument at a temperature of 23° C. and at 50% RH.

The oxygen transfer rate (OTR) as expressed herein is measured in accordance with ASTM D3985, at a temperature of 23° C. and at 50% relative humidity (RH).

The number of pinholes as expressed herein is measured in accordance with EN13676:2001. The measurement involves treating the packaging material with a coloring solution (e.g. dyestuff E131 Blue in ethanol) and inspecting the surface microscopically.

The reject received from the repulping of the packaging material is determined according to PTS test method RH021/97.

The KIT value is a measure of the grease resistance and is measured in accordance with TAPPI T559.

The grease resistance of creased and folded packaging materials is measured in accordance with ASTM F119-82. Prior to the measurement, the material was creased (Morgana Docu-Crease 52) and folded by a 2.07 kg roller and exposed on the first barrier-coated side, to animal oil (chicken fat) at 60° C. The time required to show a visual change on a thin-layer chromotography plate with a 254 nm fluorescent indicator placed under the board (=break through time or failure time) were noted. The grease resistance defines the break through- or failure time.

The invention relates to a heat sealable packaging material for the packaging of liquid or food having a first and a second side. The paperboard is provided with a first and an optional second dispersion coating layer on its first side. An extrusion coated barrier layer comprising a polyolefin is applied onto the first or optional second dispersion coating layer. The coat weight of the extrusion coated barrier layer is preferably less than 15 gsm, preferably less than 10 gsm, most preferably less than 7 gsm. Preferably, the coat weight of the extrusion coated barrier layer is in a range from ≥1 gsm to ≤15 gsm, or in a range from ≥5 gsm to ≤10 gsm.

The present inventors have found that a combination of one or two dispersion coating layer/s and a very thin extrusion coated barrier layer of a polyolefin provides good barrier properties layer and heat-sealability. The packaging material is further recyclable and re-pulpable. The application of a dispersion coating layer in-between the paperboard substrate and the extrusion coated layer facilitates the separation of the extruded polyolefin layer in the re-pulping. In addition, the amount of plastics in the packaging material is minimized. Moreover, the inventive packaging material provides a resistance towards blocking, which is a common problem with dispersion coated paperboard.

The extrusion coated barrier layer may form the inside of a packaging made from the material. In an alternative embodiment, the extrusion coated barrier layer forms a printing surface and are thus to form the print side of a thereof formed packaging. In this embodiment the coating structure comprising the dispersion coating layer and the extrusion coated barrier layer form a barrier against moisture arising from condensation.

The paperboard substrate is preferably a multi-layer paperboard, comprising a top ply and a back ply and one or several middle plies, which middle plies provide bulk. The paperboard substrate, particularly the one or more middle plies can contain sulphate/kraft pulp and CTMP, which advantageously provide bulk. The pulp can be unbleached or bleached. The ply providing bulk may comprise at least 30 wt % or at least 50 wt % or at least 70 wt % of fibers originating from pressurized groundwood (PGW), chemithermomechanical pulp (CTMP) or thermomechanical pulp (TMP). The substrate may have a basis weight of at least 125 gsm, or at least 150 gsm, or at least 180 gsm, such as in the range of 125-500 gsm. On the top ply a mineral coating can be applied. Preferably, the top ply is without a mineral coating. The top ply and/or the back ply of the substrate may be untreated or surface sized, for example with a thin layer of starch, on one or both sides.

Preferably, the said extrusion coated barrier layer constitutes less than 5 wt % of the total weight of the packaging material, preferably in a range from ≥0.1 wt % to ≤4 wt % or in a range of ≥1 wt % to ≤4 wt %, calculated on the total weight of the packaging material.

The polyolefin of the extrusion coated barrier layer may be a thermoplastic polyolefin, such as polyethylene (PE), polypropylene (PP), cyclic olefin copolymer (COC), polymethylpentene (PMP), or mixtures thereof. In preferred embodiments, the polyolefin of the extrusion coated layer is selected from the group of polyethylene and polypropylene. These provide particularly good barrier properties and allow good application by extrusion coating.

The weight of the extruded barrier layer may further depend on the basis weight of the paperboard substrate. In embodiments, the paperboard substrate may have a low grammage in a range from ≥150 to ≤230 gsm, wherein the extrusion coated barrier layer may have a grammage in a range from ≥1.5 to ≤11 gsm or from ≥1.5 to ≤5 gsm, or from ≥5 to ≤11 gsm. In embodiments, the paperboard substrate may have a grammage above 230 gsm, such as in a range of from ≥230 to ≤400 gsm or from ≥200 to ≤360 gsm. In these embodiments, the extrusion coated layer may have a grammage in a range of from ≥2 to <15 gsm or from ≥10 to <15 gsm or ≥5 to ≤11 gsm.

The coat weight of the first dispersion coating layer, or the sum of the coat weight of the first and the optional second dispersion coating layer, may be in a range of from ≥5 to ≤40 gsm, preferably in a range from ≥10 to ≤30 gsm or from ≥0 to ≤20 gsm.

The packaging material of the invention has shown to provide excellent barrier properties against moisture, grease and/or gas. The packaging material may exhibit a water absorption rate of below 15 g/m$^2$, preferably of below 13 g/m$^2$ and most preferably below 10 g/m$^2$ as measured using COBB 600 in accordance with SCAN-P 12:64 and/or a Water Vapor Transfer Rate (WVTR) of less than 15 g/m$^2$/24 h, preferably less than 10, or 5 g/m$^2$/24 h as measured using ASTM F1249. The packaging material may further exhibit an oxygen transfer rate (OTR) of below 50 cc/m$^2$*day*atm, preferably below 20 cc/m$^2$, or even below 10 cc/m$^2$, measured according to ASTM D3985, 23° C., 50% relative humidity (RH). The packaging material of the invention may further exhibit a KIT value of above 10, preferably 12 as measured in accordance with the TAPPI 559. The KIT value is preferably ranging from ≥10 to ≤12.

The packaging material of the invention has further shown to exhibit excellent barrier properties also when folded and creased. The grease resistance of the packaging material as creased and folded is preferably at least 20 h, preferably at least 25 h, according to ASTM F119-82 (60° C., 0% RH).

In some embodiments, the packaging material comprises less than 100 pinholes/m$^2$, preferably less than 10 pinholes/m$^2$, and more preferably less than 0 pinholes/m$^2$, as measured on the extrusion coated layer according to standard EN13676:2001. Pinholes are microscopic holes that might appear in an extrusion coated film during the coating process. Such pinholes may be formed e.g. due to irragularities in the base board. In the art, it has been assumed that quite high coat weights of extrusion coating layers are needed to keep pinhole formation under an acceptable limit. The present invention has surprisingly shown that pinholes can be diminished or avoided even with low weights of extrusion coated layers.

The packaging material of the invention is further easily repulpable. The reject received from the repulping of the packaging material (determined according to PTS test method RH021/97) is preferably less than 12 wt % preferably less than 10 wt %, more preferably less than 7 wt %, based on a dry weight of the packaging material of 100 wt %.

In embodiments, the packaging material of the invention may further comprise a second extrusion coated barrier layer comprising a polyolefin, wherein the sum of the weight of the (first) extrusion coated barrier layer and the second extrusion coated barrier layer is less than 15 gsm, preferably less than 10 gsm, most preferably less than 7 gsm. In one embodiment, the weight of said first and second extrusion coated barrier layer constitutes less than 5 wt % of the total weight of the packaging material. In these embodiments, the said first extrusion coated barrier layer and said second extrusion coated barrier layer constitutes the only extrusion coated or laminated thermoplastic polymer layers of the packaging material. The said second extrusion coated barrier layer is preferably adapted to form the inner surface of a thereof formed packaging and is adapted to be in direct contact with the content of the packaging. Preferably, said second extrusion coated barrier layer is applied onto said first extrusion coated barrier layer. In embodiments, said first and second extrusion coated barrier layer may be applied to the paperboard substrate by use of co-extrusion.

Preferably, the sum of all extrusion coated barrier layers comprising a polyolefin applied on the packaging material constitutes less than 5 wt % of the total weight of the packaging material. Preferably, the sum of the coat weights of all extrusion coated barrier layers comprising a polyolefin is less than 15 gsm, preferably less than 10 gsm or less than 7 gsm. Preferably, the sum of the coat weights of all extrusion coated barrier layers comprising a polyolefin is in a range from ≥1 gsm to ≤15 gsm, or in a range from ≥5 gsm to ≤10 gsm. Preferably, the packaging material does not comprise any further extrusion coated or laminated thermoplastic polymer layers or any layer of aluminum.

The first and optional second dispersion coating layer may comprise a latex and/or a polyolefin. Preferably the first and optional second dispersion coating layer comprise the latex and/or polyolefin in an amount of at least 30 wt %, such as in a range of from ≥30 wt % to ≤100 wt %, or in a range of from ≥30 wt % to ≤70 wt %, calculated of the total solid content of the layer. The latex may be selected from the group comprising styrene-butadiene latex, styrene-acrylate latex, acrylate latex, vinyl-acetate latex, acrylate latex, vinyl acetate latex, vinyl acetate-acrylate latex, styrene-butadiene-acrylonitrile latex, styrene-acrylate-acrylonitrile latex, styrene-butadiene-acrylate-acrylonitrile latex, styrene-maleic anhydride latex, styrene-acrylate-maleic anhydride latex, or mixture of these latexes. The latex is preferably a styrene-butadiene (SB) latex or a styrene-acrylate (SA) latex, acrylate latex, vinyl acetate latex, or vinyl acetat-acrylate latex, or mixture of these latexes. The latex can be biobased, i.e. derived from biomass, such as biobased styrene-acrylate or styrene-butadiene latex. Biobased latex can provide similar performance and provides improved carbon footprint.

The first and/or second dispersion coating layer may further comprise pigments, such a pigment selected from the group of clay (preferably kaolin clay), calcium carbonate and/or talc.

In addition to latex and pigments, the dispersion coating layer or layers may further comprise a small amount of additives, such as between 0.1-5 wt %, or 0.1-1, or 1-5 wt %, as calculated on the dry weight of said dispersion coating layer. Additives may include thickening agents, defoaming or antifoaming agents, dispersing aids, additional pigments, cross-linkers, slip additives, fillers, release agents, preservatives and antiblocking agents.

In accordance with one embodiment of the invention, the at least one dispersion coating layer comprises a cross-linker. Cross-linker as used herein is meant to define an agent that reacts with carboxyl- and/or hydroxyl groups. The cross-linker is preferably chosen from the group of Ammonium Zirconium Carbonate (AZC), Potassium Zirconium Carbonate, Potassium Zirconium Acetate (Methylated) melamine formaldehyde resin or (methylated) urea formaldehyde resin, Glyoxal, Imidazoline derivatives, di-aldehyde polysaccharides and combinations thereof. The cross-linker is preferably added in an amount of between 0.1-5 wt %, or between 1-2 wt % as calculated on the dry weight of said dispersion coating layer. The cross-linker further improves the barrier properties e.g. by providing a denser and less porous coating layer. In addition, the smoothness of the surface is improved. In one preferred embodiment, the cross linker is chosen from the group of dialdehyde polysaccharides such as dialdehyde cellulose (DAC) and dialdehyde starch.

In embodiments, the packaging material comprises a second dispersion coating layer applied on the first dispersion coating layer, which first and second dispersion coating layers are applied between the paperboard substrate and the extrusion coated barrier layer.

The first and second dispersion coating layer may be applied at a total coat weight in a range of 10-40 gsm, preferably in a range from 20-40 gsm or 25-35 gsm. Preferably, the first dispersion coating layer is applied in a coat weight of 10-20 gsm, while the second dispersion coating layer is applied in a coat weight of 10-20 gsm. The application of at least two dispersion coating layers further increases the barrier properties, especially by reducing the number of pinholes formed in the barrier.

In embodiments, the first dispersion coating layer comprises latex and optionally pigment and the second dispersion coating layer comprises a polyolefin.

In one embodiment, the first dispersion coating layer may comprise the latex in an amount in a range from ≥30 wt % to ≤70 wt %, based on the dry solid content of the layer. In this embodiment, the first dispersion coating layer may comprise pigment, such as clay and/or talc, in an amount in a range from ≥30 wt % to ≤70 wt %, preferably in an amount of around 60 wt %, based on the dry solid content of the layer.

In embodiments, the second dispersion coating layer may comprise a polyolefin selected from the group of polyethylene (PE), polypropylene (PP) and/or copolymers of polyethylene and polypropylene. In these embodiments, the second dispersion coating layer may further comprise a co-binder. Co-binders may be selected from starch, polyvinyl alcohol (PVOH), carboxymethyl cellulose (CMC) and latex. Preferably, the co-binder is a latex. Preferably, the latex is selected from styrene-butadiene latex, styrene-acrylate latex, or a mixture thereof In one embodiment, the second dispersion coating layer paperboard comprises a polyolefin in an amount in a range from ≥90 wt % to ≤100 wt %, preferably in a range from ≥90 wt % to ≤98 wt %, based on the dry solid content of the layer. In this embodiment, the second dispersion coating layer may free of pigments and may comprise a co-binder in a range from ≥0 wt % to ≤10 wt %, preferably in a range from ≥2 wt % to ≤10 wt %, based on the dry solid content of the layer.

In another embodiment, the second dispersion coating layer may comprise a polyolefin in an amount in a range from ≥40 wt % to ≤90 wt %, preferably in a range from ≥60 wt % to ≤80 wt %, based on the dry solid content of the layer. In this embodiment, the second dispersion coating layer may comprise a co-binder, such as latex, in a range from ≥10 wt % to ≤60 wt %, preferably in a range from ≥20 wt % to ≤40 wt %, based on the dry solid content of the layer.

In other embodiments, the first dispersion coating layer may comprise latex and the second dispersion coating layer may comprise latex and optionally pigment. In these embodiments, the first dispersion coating layer may comprise the latex to an amount of 100 wt % and the second dispersion coating layer may comprise the latex in an amount in a range from ≥30 wt % to ≤70 wt %, based on the dry solid content of the said layer and pigment in an amount in a range from ≥30 wt % to ≤70 wt %, preferably in an amount of 60 wt %, based on the dry solid content of the layer.

In embodiments, the packaging material may be provided with a third dispersion coating layer on the second side of the paperboard substrate. The packaging material may be further provided with a fourth dispersion coating layer applied onto said third dispersion coating layer. These third and optional fourth dispersion coating layers may also comprise binders and optionally pigment, such as latex and pigment or polyolefin and pigment. The said third and optional fourth dispersion coating layer/s may constitute the only barrier layers applied on the second side. Said second side may preferably form a printing surface and in such embodiments, said coating layer/s particularly form a barrier against moisture arising from condensation.

The method to produce the inventive packaging material comprises the step of applying, in a first coating step, the first and optional second dispersion coating layer on a first side of a paperboard substrate. The dispersion coating layers may be applied by customary methods such as the use of roller coating, spray coating, curtain, blade coating, slot coating, immersion coating, gravure roll coating, reverse direct gravure coating, rod coating, soft-tip blade coating and/or combinations thereof. Preferably, the coating method is an impact coating method, most preferably blade coating or rod coating. The use of impact coating methods to apply the dispersion coating layer enhances the adhesion of the extrusion coated polyolefin layer. The solid content of the dispersion coating may be between 10-70% by weight, preferably between 30-70%, most preferably between 40-65% by weight. The viscosity of the dispersion used for dispersion coating is preferable between 500-1000 mPas. However, the dispersion may be diluted with water or any other solvent in order to achieve the desired viscosity.

The substrate comprising the dispersion coating layer is preferably dried by use of conventional drying techniques using e.g. hot air, preferably to a dry content of 85-95 wt %. Thereafter, in a second coating step, a first barrier coating layer comprising a polyolefin is applied on the dispersion coated substrate by extrusion coating. Extrusion coating is a continuous process by which a thermoplastic polymer such as a polyolefin is melted and extruded through a flat die onto a chill roll. The chill roll primarily acts as a heat transfer and finishing device in the extrusion and coating operations.

In embodiments, the said first coating step and said second coating step are applied integrated within the same coating line. In the context of the application, "integrated within the same coating line" is meant to define that the coating steps are applied in the same process step on the same coating machine, preferably an off-line coating machine, when the web is running between an unwind station and a rewind station.

The invention further relates to a packaging comprising or being made from the above disclosed packaging material. The packaging is preferably made by use of heat-sealing. In preferred embodiments, said first side forms the inside of the said packaging and the second side forms the print side. In these embodiments, the (first) extrusion coated barrier layer or the second extrusion coated barrier layer may preferably form an inner surface of the packaging and the said layer is thus adapted to be in contact with the content of the packaging. The packaging of the invention is suitable for packaging of liquid and/or food.

Further features of the present invention will become apparent from the examples and figures, wherein.

Figure 1:
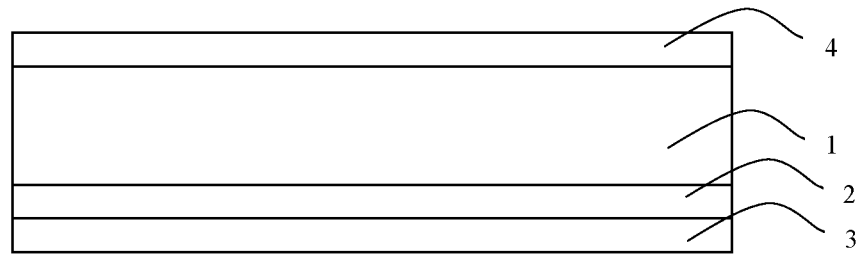
FIG. 1 is a schematic drawing of a packaging material according to an embodiment of the invention.

The packaging material shown in FIG. 1 comprises a paperboard substrate (1). The paperboard substrate has a first and a second side, wherein on the first side the paperboard substrate is coated with a first dispersion coating layer (2) providing a barrier against liquid, moisture, grease and/or gas. A layer of polyolefin (3), such as of polyethylene or polypropylene, is extrusion coated on the first dispersion coating layer (2). The extrusion coated layer (3) will be in contact with the content of a packaging formed from the packaging material. The second side of the paperboard substrate 1 may be coated with a second dispersion coating layer (4), wherein the dispersion coating layer (4) forms the printing surface of the packaging material.

Figure 2:
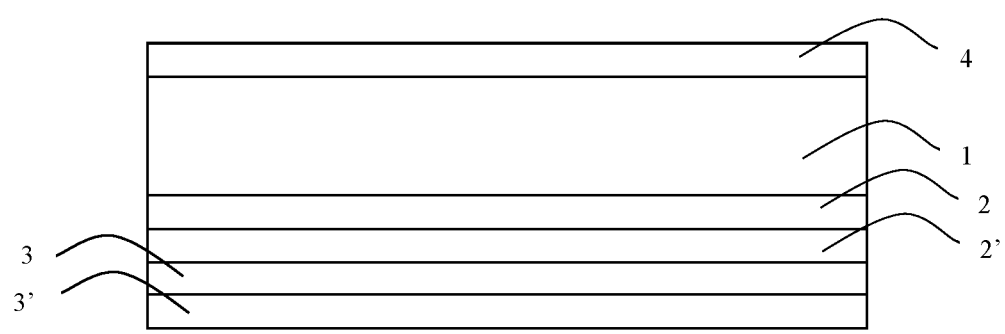
FIG. 2 is a schematic drawing of a packaging material according to a further embodiment of the invention.

The packaging material shown in FIG. 2 comprises a paperboard substrate 1. The paperboard has a first and a second side, wherein on the first side the paperboard substrate is coated with a first and a second dispersion coating layer (2, 2'). A first and a second layer of polyolefin (3, 3') is extrusion coated on the second dispersion coating layer (2'). The second extrusion coated layer (3') will be in contact with the content of the packaging formed from the packaging material. The second side of the paperboard substrate (1) is coated with a second dispersion coating layer (4).

The paperboard as shown in FIG. 1 or 2 is particularly suitable for heat-sealed packages for liquid and/or food.

The invention claimed is:

1. A heat-sealable packaging material comprising:
   a paperboard substrate comprising a first side and a second side,
   a first dispersion coating layer on the first side, wherein the first dispersion coating layer provides a barrier against at least one of liquid, moisture, grease and gas,
   an extrusion coated barrier layer comprising a polyolefin,
   a second dispersion coating layer applied on the first dispersion coating layer, wherein the first and second dispersion coating layers are applied between the paperboard substrate and the extrusion coated barrier layer, wherein the first dispersion coating layer comprises latex and the second dispersion coating layer comprises a polyolefin, and
   wherein a coat weight of the extrusion coated barrier layer is less than 15 gsm.

2. The heat-sealable packaging material according to claim 1, wherein the extrusion coated barrier layer constitutes less than 5 wt % of a total weight of the packaging material.

3. The heat-sealable packaging material according to claim 1, wherein the heat-sealable packaging material exhibits a water absorption rate of below 15 g/m$^2$ as measured using COBB 600 in accordance with SCAN-P 12:64, or a Water Vapor Transfer Rate (WVTR) of less than 15 g/m$^2$/24 h as measured using ASTM F1249, or both.

4. The heat-sealable packaging material according to claim 1, wherein the heat-heat sealable packaging material exhibits an oxygen transfer rate (OTR) of below 50 cc/m$^2$*day*atm as measured according to ASTM D3985, 23° C., 50% relative humidity (RH).

5. The heat-sealable packaging material according to claim 1, wherein the heat-sealable packaging material comprises less than 10 pinholes/m$^2$ as measured according to standard EN13676:2001.

6. The heat-sealable packaging material according to claim 1, wherein an amount of rejects received from re-pulping of the heat-sealable packaging material (determined according to PTS test method RH021/97) is less than 12 wt % based on a dry weight of the packaging material of 100 weight %.

7. The heat-sealable packaging material according to claim 1, wherein the heat-sealable packaging material exhibits a KIT value of above 10 as measured in accordance with TAPPI 559.

8. The heat-sealable packaging material according to claim 1, wherein a grease resistance of a folded and creased heat-sealable packaging material is at least 20 h according to ASTM F119-82 (60° C.).

9. The heat-sealable packaging material according to claim 1 further comprising:
   a second extrusion coated barrier layer comprising a polyolefin, wherein a sum of a weight of the extrusion coated barrier layer and the second extrusion coated barrier layer is less than 15 gsm.

10. The heat-sealable packaging material according to claim 1, wherein the second dispersion coating layer comprises a polyolefin selected from a group consisting of polyethylene (PE), polypropylene (PP), copolymers of polyethylene and polypropylene, and combinations thereof.

11. The heat-sealable packaging material according to claim 1, wherein the first dispersion coating layer comprises latex and the second dispersion coating layer comprises latex.

12. The heat-sealable packaging material according to claim 1, wherein a third dispersion coating layer is applied on the second side of the paperboard substrate.

13. A packaging comprising or being made from the heat-sealable packaging material according to claim 1.

14. The packaging according to claim 13, wherein the packaging is for a liquid, or a food, or both.

* * * * *